US006942945B2

(12) United States Patent
Andersen et al.

(10) Patent No.: US 6,942,945 B2
(45) Date of Patent: Sep. 13, 2005

(54) ADAPTER SYSTEM FOR A BATTERY

(75) Inventors: Glenn W. Andersen, Hartford, WI (US); Lisa M. Franklin, Racine, WI (US); Peter Gratschmayr, New Berlin, WI (US); Mark S. Inkmann, Wauwatosa, WI (US); Robert Spanier, Waukesha, WI (US)

(73) Assignee: Johnson Controls Technology Company, Plymouth, MI (US)

( * ) Notice: Subject to any disclaimer, the term of this patent is extended or adjusted under 35 U.S.C. 154(b) by 51 days.

(21) Appl. No.: 09/967,886

(22) Filed: Sep. 28, 2001

(65) Prior Publication Data

US 2003/0064281 A1 Apr. 3, 2003

(51) Int. Cl.⁷ ................................................ H01M 2/28
(52) U.S. Cl. ........................ 429/121; 429/97; 429/98; 429/99; 429/100; 429/123; D13/119
(58) Field of Search ............................ 429/97, 98, 99, 429/100, 121, 123, 125, 500; D13/119

(56) References Cited

U.S. PATENT DOCUMENTS

| 1,430,741 A | 10/1922 | Keller |
| 1,952,150 A | 3/1934 | Trimble et al. |
| 2,710,660 A | 6/1955 | Coleman |
| 2,842,608 A | 7/1958 | Querengässer et al. |
| 2,861,117 A | 11/1958 | Sindel |
| 2,902,532 A | 9/1959 | Toce et al. |
| 2,947,374 A | 8/1960 | Moore |
| 2,979,146 A | 4/1961 | Fogle |
| 3,061,662 A | 10/1962 | Toce et al. |
| 3,105,567 A | 10/1963 | Schultz, Jr. |
| 3,937,636 A | 2/1976 | Slautterback |
| 4,125,683 A | * 11/1978 | Beckford et al. ........... 429/121 |
| 4,169,191 A | 9/1979 | Alt et al. |
| 4,255,502 A | 3/1981 | Taylor, III |
| 4,317,497 A | 3/1982 | Alt et al. |
| 4,327,809 A | 5/1982 | Fenstermaker |

(Continued)

OTHER PUBLICATIONS

U.S. Design Appl. No. 29/148,976, titled "Adapter System for a Battery", filed on Sep. 28, 2001, including specification and drawings (7 sheets).
Adapter available from Johnson Controls, Inc. of Plymouth, Michigan obtained in or about 2000 (4 color sheets).
Adapter available from Johnson Controls, Inc. of Plymouth, Michigan obtained in or about 2000 (7 color sheets).
Adapter available from Delco Electronics Systems of Kokomo, Indiana obtained in or about 2000 (5 color sheets).
Adapter available from Delco Electronics Systems of Kokomo, Indiana obtained in or about 2000 (4 color sheets).

(Continued)

Primary Examiner—Dah-Wei Yuan
(74) Attorney, Agent, or Firm—Foley & Lardner LLP (57) ABSTRACT

A battery and adapter system includes a first battery adapter and a second battery adapter. The first battery adapter may be coupled to a storage battery, and a second battery adapter may be coupled to the first battery adapter. The first and second battery adapters may include features or elements that allow attachment to another battery adapter and to a storage battery.

61 Claims, 7 Drawing Sheets

U.S. PATENT DOCUMENTS

| | | | |
|---|---|---|---|
| 4,431,717 A | | 2/1984 | Kikuchi |
| 4,508,794 A | | 4/1985 | Wright |
| 4,515,233 A | | 5/1985 | Silverstein |
| 4,529,053 A | | 7/1985 | Tucker |
| 4,613,550 A | | 9/1986 | Jergl et al. |
| 4,645,725 A | | 2/1987 | Kump et al. |
| 4,682,751 A | | 7/1987 | Tamas |
| 4,701,386 A | | 10/1987 | Kump et al. |
| 4,752,543 A | | 6/1988 | Anderson et al. |
| 4,754,827 A | | 7/1988 | Hirabayashi |
| 4,770,958 A | | 9/1988 | Newman et al. |
| 4,808,495 A | | 2/1989 | Goldstein |
| 4,891,270 A | | 1/1990 | Jergl et al. |
| 4,952,468 A | | 8/1990 | Abraham et al. |
| D311,898 S | | 11/1990 | Luzader et al. |
| 5,004,129 A | | 4/1991 | Loch et al. |
| 5,283,137 A | | 2/1994 | Ching |
| D348,046 S | | 6/1994 | Hulsebus |
| 5,415,956 A | * | 5/1995 | Ching .................. 429/187 |
| 5,484,667 A | | 1/1996 | Sahli et al. |
| 5,736,272 A | * | 4/1998 | Veenstra et al. ............. 429/99 |
| 5,766,801 A | * | 6/1998 | Inoue et al. ................. 429/99 |
| 5,977,485 A | | 11/1999 | Yoshimura et al. |
| 6,004,689 A | | 12/1999 | Walker et al. |
| 6,010,804 A | | 1/2000 | Barksdale |
| 6,023,146 A | | 2/2000 | Casale et al. |
| 6,160,702 A | | 12/2000 | Lee et al. |
| D450,653 S | | 11/2001 | Hertel et al. |
| D466,478 S | | 12/2002 | Bolstad et al. |
| D468,261 S | | 1/2003 | Peng |

OTHER PUBLICATIONS

Adapter available from East Penn Manufacturing Co., Inc. of Lyon Station, Pennsylvania obtained in or about 2000 (3 color sheets).

Adapter available from GNB Technologies, Inc. of Mendota Heights, Minnesota obtained in or about 2000 (3 color sheets).

Adapter available from GNB Technologies, Inc. of Mendota Heights, Minnesota obtained in or about 2000 (5 color sheets).

Adapter available from Exide Technologies of Princeton, New Jersey obtained in or about 2000 (5 color sheets).

* cited by examiner

ADAPTER SYSTEM FOR A BATTERY

CROSS-REFERENCE TO RELATED APPLICATIONS

The following U.S. patent application is cited by reference and incorporated by reference herein: Ser. No. 29/148,976, titled "ADAPTER SYSTEM FOR A BATTERY" and filed Sep. 28, 2001.

FIELD OF THE INVENTION

The present invention relates generally to an adapter system for a battery. More specifically, the present invention relates to height adapters and hold-down adapters used with a battery.

BACKGROUND OF THE INVENTION

Storage batteries used in automobiles and other applications are generally produced in a limited number of standard shapes and sizes. Manufacturers of automobiles and other applications take these standards shapes and sizes into account when designing their products. For example, a space may be provided in an automobile engine compartment that is precisely the correct size for containing a certain type of battery having a standard shape and size.

Although a particular storage battery may have adequate performance characteristics for use in a particular automobile or other application, the battery may have a size and shape that is different from the space designed to contain the battery. For example, a battery tray for holding a battery may have lateral dimensions that are larger than the base of the battery. This may result in sliding or tipping of the battery when in use.

Battery adapters are designed to attach to a battery to alter the effective size of the battery. For example, in applications using a "bottom hold-down" system, flanges or pucks are provided to secure the bottom of the battery in place in a battery tray or similar structure. Where a battery has a base with smaller lateral dimensions than those of a particular battery tray, a hold-down adapter may be provided that attaches to the base of the battery to increase the effective size or width of the battery base. The flanges or pucks used in the bottom hold-down system may then rest against external surfaces of the adapter to secure the battery in place. In another example, applications using a "top hold-down" system may include a bar or bracket that engages a top surface of a battery to secure the battery in place. Where a battery has insufficient height to engage the bar or bracket, a height adapter may be attached to the base of the battery to increase the effective height of the battery.

Battery adapters used today may be improved in a number of ways. For example, manufacturers of battery adapters may ship the adapters separate from the batteries on which they may be used. In another example, a given battery adapter may only be configured for use with a particular type of battery, which forces retailers to order several different brands or types of adapters. In a further example, since there may be many different applications in which batteries may be used, it may be difficult for retailers to estimate the proper number of each type of adapter that should be ordered. In a further example, present methods for shipping adapters and batteries result in unnecessary damage and expense (e.g., shipping adapters separate from batteries requires additional shipping crates, pallets, etc.).

It would thus be advantageous to provide a battery assembly in which a height adapter and hold-down adapter could both be attached to a battery for shipping. It would also be advantageous to provide a method for attaching a hold-down adapter and a height adapter to a battery. It would further be advantageous to provide a battery adapter that includes one or more features that may be used to attach the adapter both to other adapters and to a battery. It further be advantageous to provide a battery adapter that may nest with other identical adapters. It would further be advantageous to provide a system or method that allows more compact and efficient shipping of batteries and battery adapters. It would further be advantageous to provide a method for shipping a battery that is more efficient and results in fewer damaged parts.

It would be desirable to provide a system or method that provides one or more of these or other advantageous features.

SUMMARY OF THE INVENTION

The present invention relates to a battery assembly. The battery assembly includes a battery, a first battery adapter coupled to the battery, and a second battery adapter coupled to the first battery adapter.

The present invention also relates to a battery and adapter system. The battery and adapter system includes an adapter set attached to the battery. The adapter set includes a first battery adapter coupled to a second battery adapter.

The present invention further relates to a battery adapter. The battery adapter includes a frame and a plurality of connectors extending from the frame and configured for coupling with a second battery adapter.

The present invention further relates to a method for assembling a first battery adapter, a second battery adapter, and a battery. The method includes attaching the first battery adapter to the second battery adapter and attaching the second battery adapter to the battery.

The present invention further relates to an apparatus. The apparatus includes a first battery adapter and a second battery adapter attached to a battery.

DETAILED DESCRIPTION OF THE EXEMPLARY EMBODIMENTS

Figure 1:
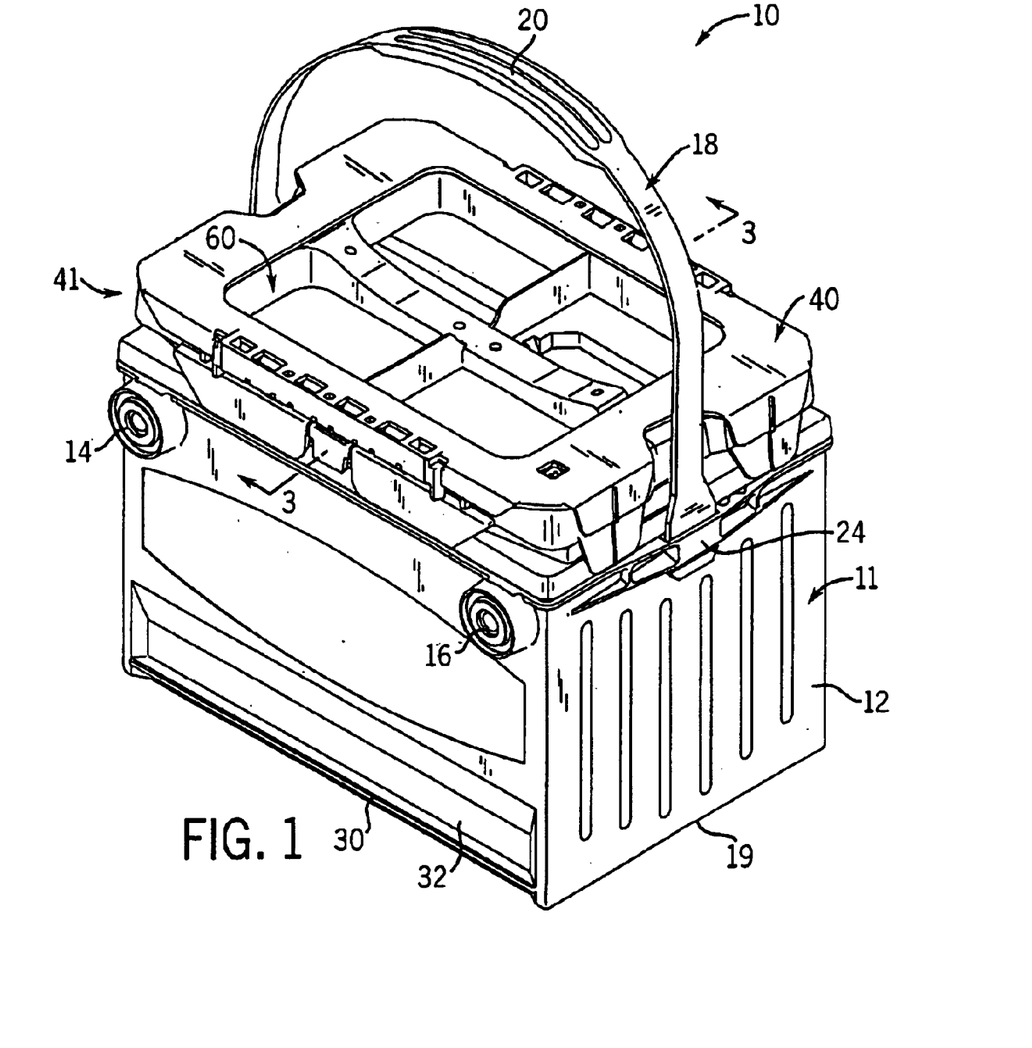
FIG. 1 is a perspective view of a battery assembly according to an exemplary embodiment.
Figure 2:
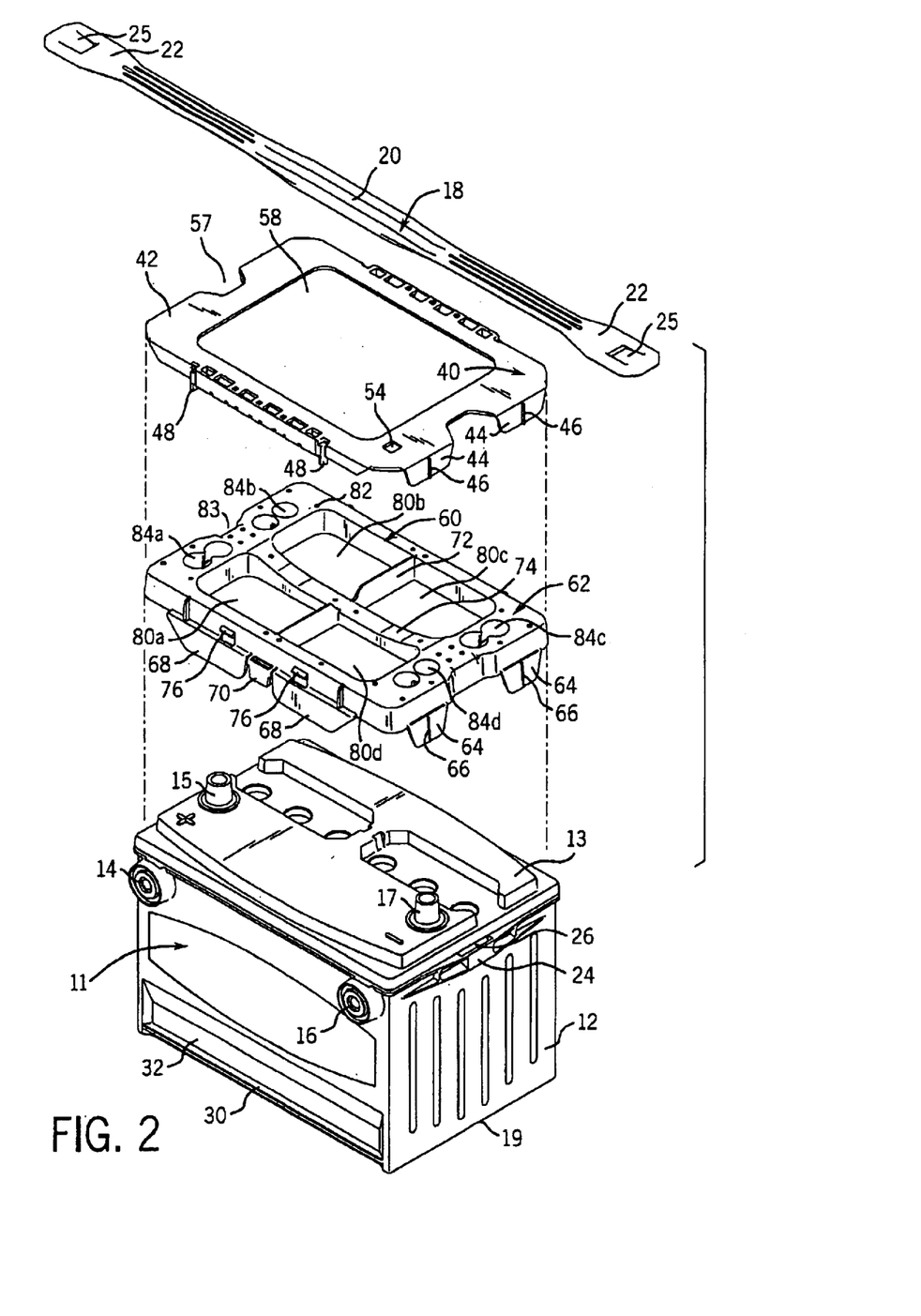
FIG. 2 is an exploded perspective view of the battery assembly shown in FIG. 1.

Referring to FIGS. 1–2, a battery and adapter system or storage battery assembly 10 is shown according to an exemplary embodiment. A battery 11, shown as a storage battery, includes a battery housing or container 12 and battery terminals or posts 15, 17. Side battery terminals or posts 14, 16 are also included in battery 11. In alternative embodiments, the battery may include either top battery terminals or side battery terminals exclusively.

A handle 18, shown as a flexible strap and having a grip or gripping portion 20, is attached to battery 11 at handle brackets 24 through an aperture 26 formed in bracket 24. Handle 18 includes an end portion or tang 22 on which a catch 25 is formed. Catch 25 may be flexible and protrudes outwardly from end portion 22 and may flex or bend inward when end portion 22 is inserted through aperture 26. Catch 25 may then act to secure handle 18 in place on battery 11 by flexing outward after insertion through aperture 26, such that at least a portion of catch 25 positively engages bracket 24 and prevents removal of end portion 22 from aperture 26 when battery 11 is lifted by handle 18. Handle 18 may be removed from battery 11 by compressing or forcing catch 25 into end portion 22 such that catch 25 and end portion 22 may slide freely through aperture 26. In alternative embodiments, other types of handles and/or handle brackets may be used.

As illustrated in the exemplary embodiment of FIG. 1, battery assembly 10 also includes a pair of battery adapters 40, 60 attached or coupled to a cover or top surface 13 of battery 11. As shown in FIG. 1, battery adapter 40 is a hold-down adapter or spacer and battery adapter 60 is a height adapter. It should be noted that while FIG. 1 illustrates height adapter 60 as being adjacent to or directly attached to surface 13 of battery 11, with hold-down adapter 40 attached to height adapter 60 and indirectly attached to battery 11, the reverse configuration may be used in an alternative embodiment, in which a height adapter is adjacent to a battery surface and a height adapter is attached thereto. In either embodiment, hold-down adapter 40 and height adapter 60 collectively comprise an adapter set 41.

Hold-down adapter 40 includes a frame or border 42 having an aperture or window 58 formed therein. Frame 42 also includes a window or aperture 54 that allows indicia or markings on height adapter 60 to be viewed when hold-down adapter 40 is attached to height adapter 60. Height adapter 60 also includes a frame or border 62. A number of drainage holes 82 are formed in frame 62 to allow fluid to pass through holes 82 and prevent pooling of fluid within height adapter 60. Opposite sides of frame 62 are connected by members 72, 74, shown in FIG. 2 as ribs. Ribs 72, 74 provide structural strength to height adapter 60 and bear at least a portion of the load when a battery rests on height adapter 60. Ribs 72, 74 also form four windows or apertures 80a, 80b, 80c, and 80d in height adapter 60. Advantageously, indicia included on battery cover 13 are visible through windows 58 and 80a–80d when height adapter 60 and hold-down adapter 40 are installed on battery 11. As such, warning labels, product labels, or other indicia applied to or printed on surface 13 of battery 11 need not be obscured when battery adapters 40, 60 are attached.

In addition to providing structural strength for adapter 60, rib 74 also provides a location on which handle 18 may rest when multiple battery assemblies are stacked on one another. Similarly, hold-down adapter 40 and height adapter 60 include notches or cutouts 57, 83 that are configured for allowing handle 18 to flex or bend around battery adapters 40, 60 when another battery is stacked on top of battery assembly 10. Because the top surface of rib 74 is below the top surface of frame 62, no pressure is applied on handle 18 that may weaken or deform handle 18. Further cutouts 83 include rounded or radiused edges so that handle 18 does not contact a sharp edge that may potentially damage handle 18.

Figure 9:
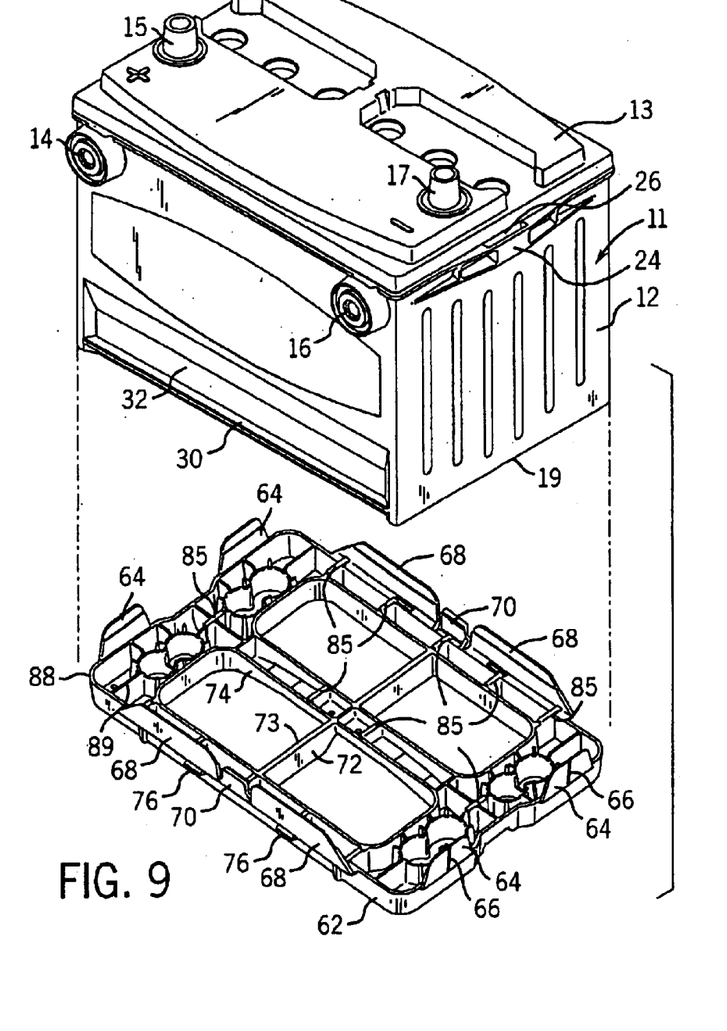
FIG. 9 is an exploded perspective view of the battery and height adapter shown in FIG. 7.

Hold-down adapter 40 and height adapter 60 are configured for installation on battery 11 over terminals 15, 17. As shown in FIGS. 2 and 9, four groups of holes or apertures 84a, 84b, 84c, and 84d are formed in frame 62 of height adapter 60. When height adapter is attached to surface 13 of battery 11, terminals 15, 17 be inserted in aperture groups 84a and 84d or in aperture group 84c and 84b, respectively.

As shown, aperture groups 84a and 84c comprise two overlapping and generally circular openings in frame 62, while aperture groups 84b and 84d comprise two separated and generally circular openings. Aperture groups 84a, 84c are designed to fit over positive battery terminals, while aperture groups 84b, 84d are designed to fit over negative battery terminals, which are generally smaller in size than positive battery terminals. Since the circular openings in aperture groups 84a and 84c overlap, larger terminals may be received in aperture groups 84a and 84c than those that may be received in aperture groups 84b and 84d. For situations in which terminals 15, 17 extend entirely through the apertures in height adapter 60, depressions or indentations 86 are provided in frame 42 and are configured for receiving a portion of battery terminals 15, 17. When both height adapter 60 and hold-down adapter 40 are installed on battery 11, a portion of terminals 15, 17 extending through height adapter 60 may be received within depressions 86 so that hold-down adapter 40 may rest flat on height adapter 60.

Adapters 40, 60 are configured for attachment to any of a variety of batteries. For example, two generally circular openings are included in aperture groups 84a–84d and in depressions 86 to accommodate batteries having terminals in different locations on the top of the batteries. Two sets of aperture groups and depressions are included so that adapters 40, 60 may be reversibly installed on a battery. By arranging the aperture groups 84a–84d and depressions 86 symmetrically, adapters 40, 60 may be placed on battery 11 without regard to proper orientation so long as the long sides of adapters 40, 60 align with the long side of battery 11.

Hold-down adapter 40 and height adapter 60 are configured to allow for convenient and secure shipping of battery assembly 10. After battery 11 is manufactured, height adapter 60 and hold-down adapter 40 may be attached to surface 13. In alternative embodiments, adapters may be configured for attaching to a different surface of a battery, such as a side of a battery to another surface of battery 11. As illustrated in FIG. 1, height adapter 60 is attached to battery 11 and hold-down adapter 40 is attached to height adapter 60. In an alternative embodiment, the arrangement of adapter 40 and height adapter 60 may be varied. For example, a hold-down adapter may be directly attached to a battery and a height adapter may be attached to the hold-down adapter. In an exemplary embodiment, attaching both hold-down adapter 40 and height adapter 60 to battery 11 allows adapters 40, 60 to be shipped along with battery 11 to its ultimate destination. It is intended that shipping adapters 40, 60 along with battery 11 will reduce shipping and storage costs, since battery 11 and adapters 40, 60 may be stored and shipped as a single unit.

Figure 6:
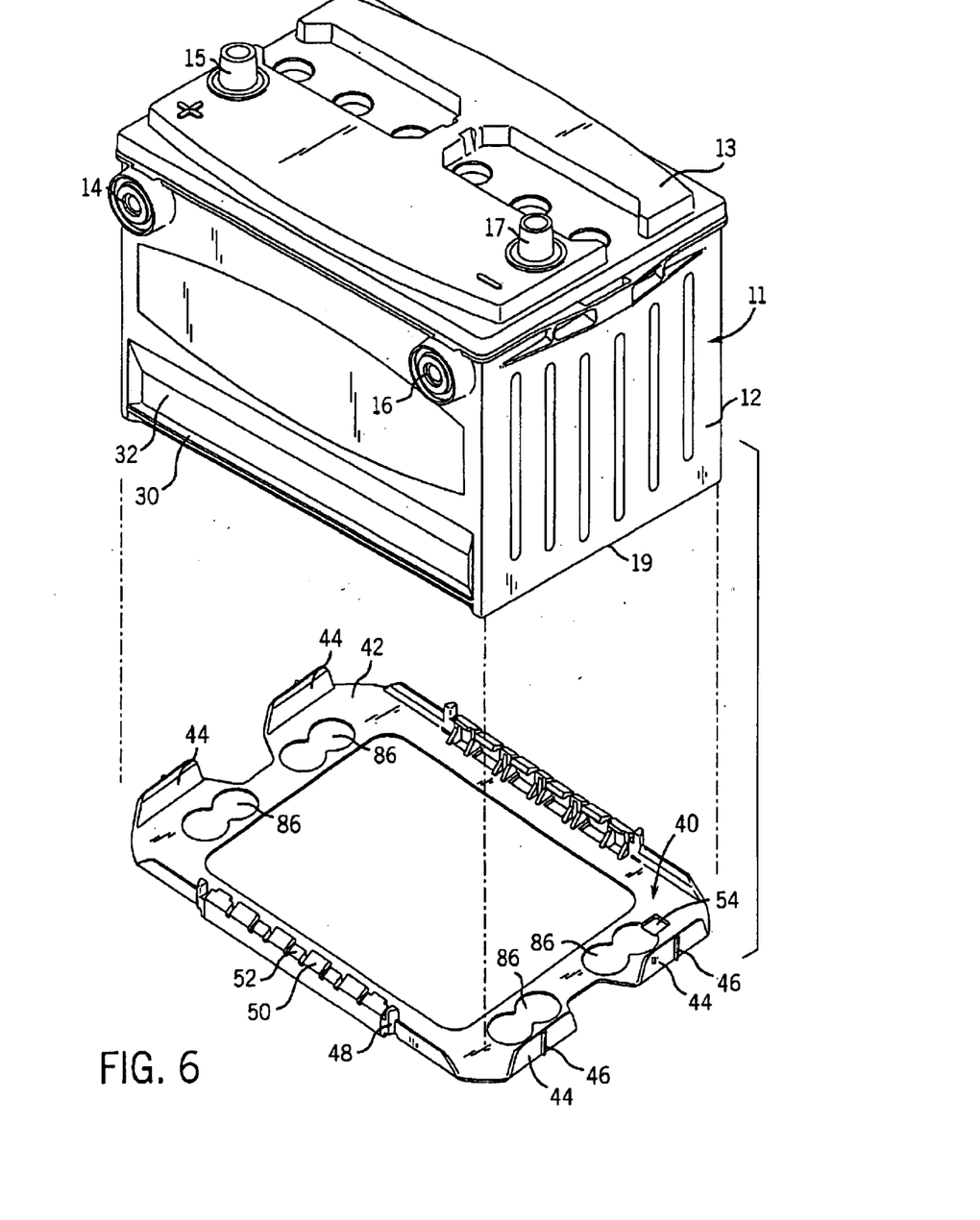
FIG. 6 is an exploded perspective view of the battery and hold-down adapter shown in FIG. 4.

Several components or elements included in adapters 40, 60 enable or assist in the attachment or coupling of adapters 40, 60 to each other, to identical adapters, and/or to battery 11. For example, as most clearly illustrated in FIGS. 2, 6, and 9, hold-down adapter 40 includes a plurality of connectors 50 (shown as clips or latches) extending outward from frame 42, and height adapter 60 includes connectors 70 (shown as clips or latches) extending outward from frame 62. Stacking members 52 extend from frame 42, along with locating ribs 48 that are attached to frame 42 at the outside of clips 50 and stacking members 52. Frame 42 also includes guides or extensions 44 on which ribs or protrusions 46 are formed. Similarly, frame 62 includes side guides or extensions 68, end guides or extensions 64 (with ribs or protrusions 66 are formed thereon), and a number of catches 76. In an alternative embodiment, one or more catches may also be included in a hold-down adapter.

Figure 3:
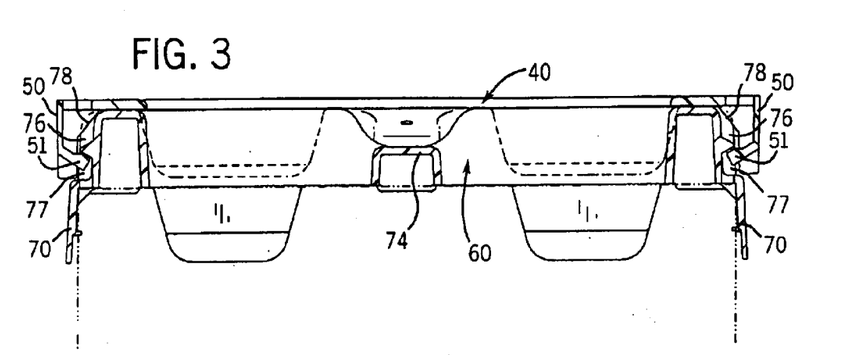
FIG. 3 is a cross-sectional view of the battery assembly shown in FIG. 1 taken across line 3—3 in FIG. 1.

Hold-down adapter 40 may be attached to height adapter 60 or to base 19 of battery 11. In operation, clips 50 act to securely yet removably attach hold-down adapter 40 to height adapter 60. When hold-down adapter 40 is installed on height adapter 60, clips 50 engage catches 76, as illustrated in FIGS. 1 and 3. To connect hold-down adapter 40 to height adapter 60, adapters 40, 60 are forced or pressed together, which causes clips 50 to engage tapered surfaces 78 of catches 76. Clips 50 deform by bending or flexing outward as additional force or pressure is applied. In the attached position shown in FIG. 3, clips 50 return substantially to their original shape by virtue of indentations 77 located adjacent to tapered portions 78 of catches 76. Thus, terminal ends 51 of clips 50 extend into indentations 77. In an alternative method of installing hold-down adapter 40 on height adapter 60, a first side of hold-down adapter 40 may be positioned at an angle to height adapter 60 to allow clips 50 on one side of hold-down adapter 40 to engage catches 76 without deforming clips 50. In this manner, clips 50 on the first side of hold-down adapter 40 may be inserted into indentation 77 without significant applied force. The second side of hold-down adapter 40 may then be rotated toward height adapter 60 such that the clips 50 on the second side of hold-down adapter 40 engage catches on a second side of height adapter 60. In this manner, only the clips on the second side of hold-down adapter 40 are forced onto height adapter 60 and flex outward.

Figures 4, 5:
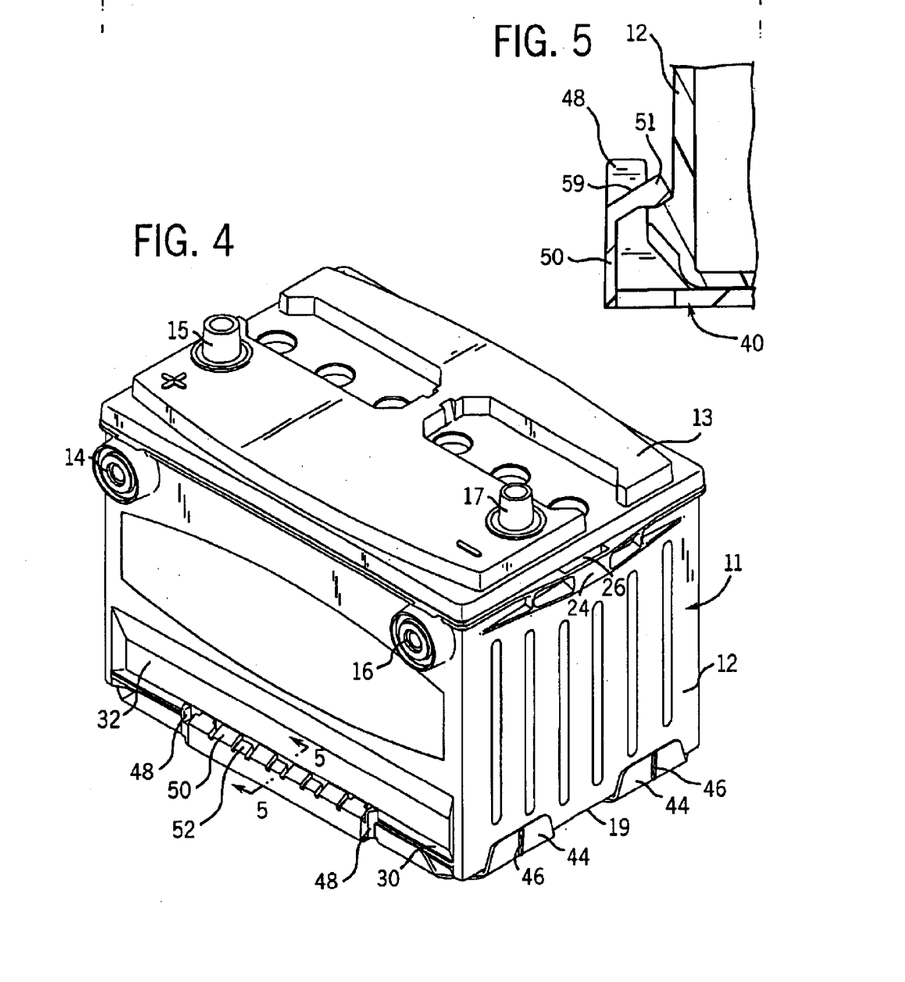
FIG. 4 is a perspective view of a battery with a hold-down adapter attached to the base of the battery.
FIG. 5 is a cross-sectional view of the battery and hold-down adapter of FIG. 4 taken across line 5—5 in FIG. 4.

Clips 50 also enable attachment of hold-down adapter 40 to base 19 of battery 11, as shown in FIGS. 4 and 5. Clips 50 are forced outward as battery 11 and hold-down adapter 40 are forced together. Clips 50 return to substantially their original position when terminal ends 51 are forced into indentations 32. In this position, terminal ends 51 engage hold-down ledges 30 to secure hold-down adapter 40 to battery 11. When battery 11 is installed in a battery tray or other structure, a puck or hold-down member may engage an external surface 59 of one or more clips 50 to secure battery 11 in place. To ensure that battery 11 is properly positioned, locating ribs 48 are configured to engage a complementary structure in a battery tray or similar structure. To prevent battery 11 from moving laterally along its length, battery 11 is positioned between guides 44, which may act as a stop to prevent lateral movement of battery 11. Guides 44 may also prevent hold-down adapter 40 from moving laterally when hold-down adapter 40 is attached to height adapter 60. Thus, when hold-down adapter 40 is attached to height adapter 60, guides 44 may engage a portion of frame 62 to prevent hold-down adapter 40 from sliding off height adapter 60.

Figure 7:
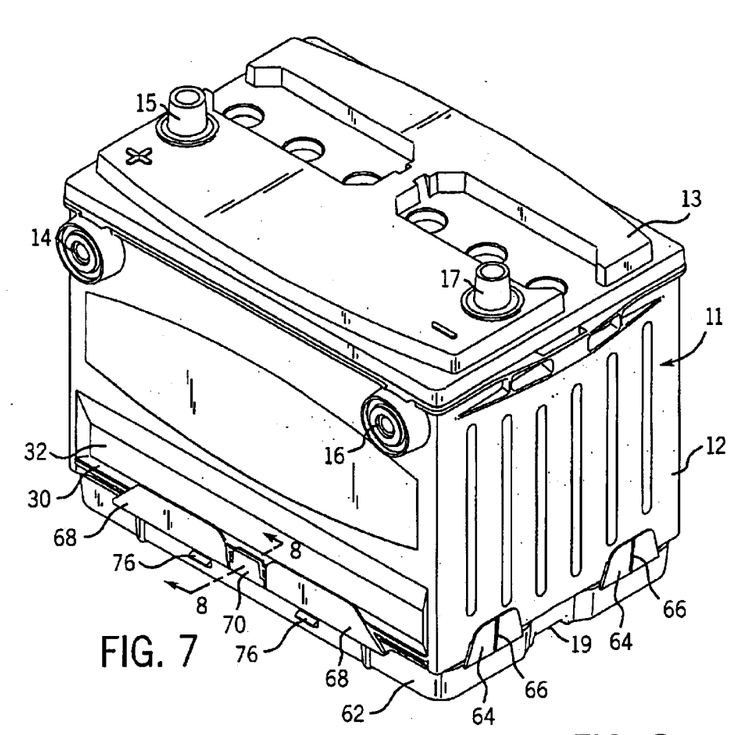
FIG. 7 is a perspective view of a battery with a height adapter attached to the base of the battery.
Figure 8:
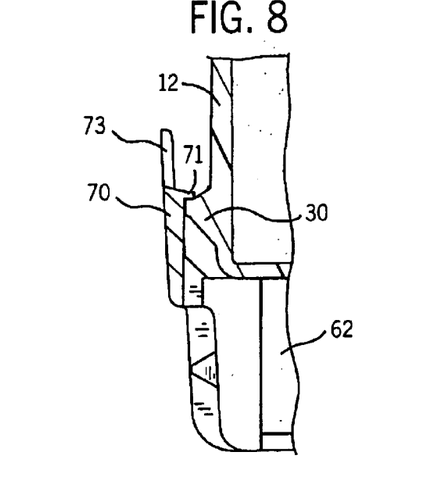
FIG. 8 is a cross-sectional view of the battery and height adapter of FIG. 7 taken across line 8—8 in FIG. 7.

Height adapter 60 may be attached either to base 19 or to surface 13 of battery 11. As shown in FIGS. 7 and 8, when height adapter 60 is attached to base 19, clips 70 engage hold-down ledges 30. Clips 70 bend or flex outwardly when height adapter 60 in forced onto battery 11 and return to substantially their original position when height adapter 60 is installed on battery 11. Catch or extension 71 on clip 70 engages hold-down ledge 30 when height adapter 60 is installed on battery 11. To remove battery 11 from height adapter 60, clip 70 may be grasped and forced away from battery 11 to release battery 11 from height adapter 60. To prevent lateral movement of battery 11 in use, side guides 68 and end guides 64 are provided. Clips 70, end guides 64, and side guides 68 prevent lateral movement, and a top hold-down bar or bracket prevents tipping or rotational movement of battery 11.

Height adapter 60 may be installed on top of battery 11 by placing height adapter 60 in position. Clips 70 do not engage features formed in battery 11. In an alternative embodiment, one or more clips or other connectors may be included in a height adapter to engage features formed in a battery or battery cover when the height adapter is attached to the top surface of the battery. To prevent lateral movement of height adapter 60, guides 64, 68 engage sides of battery 11, such as the sides of cover 13 or of container 12. Aperture groups 84a–84d also prevent lateral movement of height adapter 60 by engaging terminals 15, 17.

To prevent deformation of clips 70 when height adapter 60 is installed on top surface 13 of battery 11, a number of extensions 85 are provided in height adapter 60, as best shown in FIG. 9. Extensions 85 extend above a plane formed by the top surface of outer frame walls 88, structural members 89, and rib walls 73, 75. As shown in FIG. 9, fourteen extensions are included in frame 62, with five along each side and four along the middle portion formed in part by rib 74. Clips 70 are generally formed having a set or non-variable length, since clips 70 must attach to battery ledges 30 having standard shapes and sizes. This length may cause the clips to engage features on the battery when the height adapter is installed on top of the battery, which may result in flexure or deformation of the clips. Extensions 85 prevent this deformation by contacting top surface 13 of battery 11 when height adapter 60 is installed on battery 11, thus effectively raising clips 70 above any features of battery 11 that may cause flexure or deformation of clips 70. Notably, extensions 85 do not engage battery 11 when height adapter 60 is attached to base 19 of battery 11. Instead, battery 11 rests in the same plane as the top surfaces of outer frame walls 88, structural members 89, and rib walls 73, 75. Depressions or grooves (not shown) formed in the bottom of battery 11 provide space into which extensions 85 may protrude.

Figure 10:
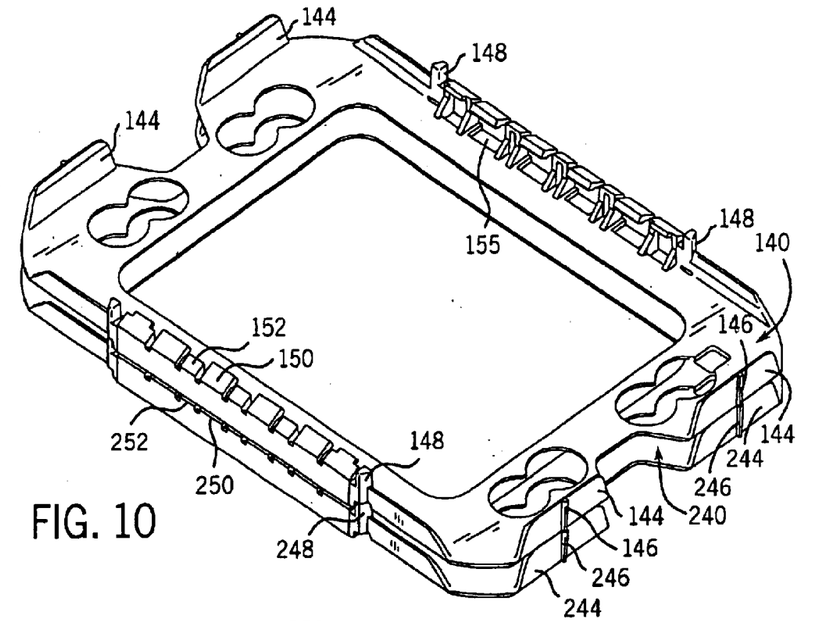
FIG. 10 is a perspective view of a pair of nesting hold-down adapters.

As shown in FIG. 10, hold-down adapters may be configured for nesting with substantially identical adapters. A hold-down adapter 140 may be stacked upon a hold-down adapter 240 for compact storage or shipping. Hold-down adapter 140 includes a number of holes or apertures 155 corresponding to the number of clips 250 included in hold-down adapter 240. Clips 250 extend into apertures 155 when hold-down adapters 140, 240 are nested. Guides 144 and ribs 146 align with guides 244 and ribs 246 to provide additional support for adapter 140. Locating rib 148 also aligns with locating rib 248. In the nesting position, adapter 140 rests upon stacking members 252, locating ribs 248, and guides 244.

Figure 11:
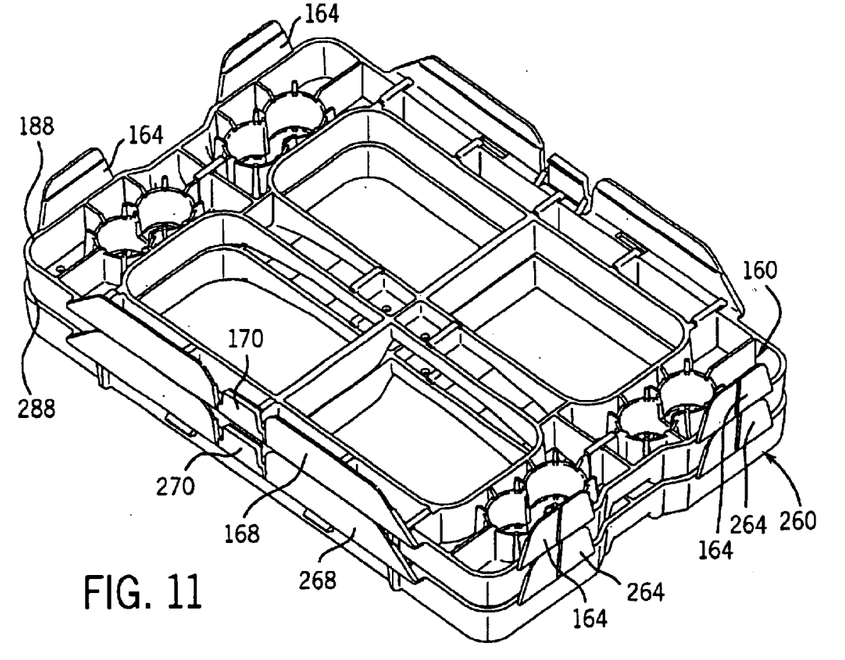
FIG. 11 is a perspective view of a pair of nesting height adapters.

As shown in FIG. 11, height adapters may be configured for nesting with substantially identical adapters. When a height adapter 160 is stacked on a height adapter 260, height adapter 160 rests on outer frame wall 288. Guides 164, 168 rest on guides 264, 268. Clips 170, however, do not rest on clips 270, which is intended to prevent unwanted deformation of clips 170, 270.

Hold-down adapters and height adapters may be formed from any suitable material. In an exemplary embodiment, both height adapters and hold-down adapters are made from a polymeric material, such as polypropylene or a polypropylene-polyethylene copolymer. Other materials may also be used. For example, one or both of the height adapter and hold-down adapter may be made from another polymeric material (e.g., polyethylene, polyester, etc.), metal (e.g., aluminum, magnesium, etc.), or composite material (e.g., glass fiber-reinforced polymers, etc.).

Each of the hold-down adapter and height adapter may be formed as single pieces or may be formed from multiple components attached together. In an exemplary embodiment, both the hold-down adapter and height adapter are injection molded as single pieces. In this manner, manufacturing costs may be minimized, since entire components may be formed in a single, relatively simple and efficient operation. In an alternative embodiment, one or more features of the hold-down adapter and/or height adapter may be formed separately and attached to the relevant adapter. For example, clips may be made separately and attached to the adapters.

Certain features of the battery and adapter system may be described with respect to certain exemplary and alternative embodiments. The size, shape, and arrangement of various components included in hold-down adapters and height adapters may be varied depending on the particular application in which the adapters may be used. A different number of clips may also be included in the adapters. Instead of having two clips, in an alternative embodiment, a height adapter may include three or more clips or may include no clips. In another alternative embodiment, the shape of connectors used in a hold-down adapter may differ from those shown in the FIGURES. Thus, instead of having a terminal end that is inclined at an angle from the plane of the hold-down adapter, the clips may have another shape. Any size or shape of clip included in a hold-down adapter that allows for coupling with another adapter or a battery may be used. Further, although the clips have been described as having dual functionality (i.e., they may be used to attach a hold-down adapter both to a battery and to a height adapter), clips may be provided in a hold-down adapter that may either connect the hold-down adapter to a battery or to a height adapter. In this alternative embodiment, different types of clips may be included in the hold-down adapter to provide different connection functions.

Certain features may be omitted without departing from the spirit and scope of the present invention. For example, although the height adapter has been described as having ribs extending between opposite sides of a frame, other alternative embodiments of a height adapter may not include ribs. In another alternative embodiment, instead of providing four aperture groups in a height adapter, two aperture groups may be provided. In a further alternative embodiment, a hold-down adapter and height adapter need not include cutouts or edges designed to prevent damage to a battery handle. In a further alternative embodiment, extensions included in a height adapter may be eliminated or may be present in a different number, shape, size, or configuration.

The attachment of parts to each other may occur in any order. For example, a hold-down adapter may be attached to a height adapter and then the adapter set may be installed on a battery. Alternatively, a hold-down adapter may be attached to a height adapter after the height adapter is attached to a battery. Note also that the height adapter and hold-down adapter may be attached to a battery either before or after a handle has been attached to the battery.

Although the present invention has been described with reference to certain exemplary embodiments, those skilled in the art who review this disclosure will readily appreciate that many modifications are possible (e.g. variations in sizes, dimensions, structures, shapes and proportions of the various elements, values of parameters, mounting arrangements, use of materials, orientations, etc.) without materially departing from the novel teachings and advantages of the subject matter recited in the claims. Accordingly, all such modifications are intended to be included within the scope of the present invention as defined in the appended claims. Although certain embodiments may have been described as including one or more features providing one or more benefits, it is contemplated that the described features may be interchanged with one another or alternatively be combined with one another in the described preferred embodiments or in other alternative embodiments. Unless specifically otherwise noted, the claims reciting a single particular element also encompass a plurality of such particular elements. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions as expressed in the appended claims.

What is claimed is:

1. A battery assembly comprising:
   a battery having a base and a cover;
   a first battery adapter coupled to the battery; and
   a second battery adapter coupled to the first battery adapter and having a configuration that differs from that of the first battery adapter;
   wherein one of the battery adapters is a height adapter configured to increase the effective height of the battery and the other of the battery adapters is a hold-down adapter configured to increase the effective width of the battery;
   wherein each of the first battery adapter and the second battery adapter are configured such that they may be selectively coupled to the base of the battery when removed from the other of the first battery adapter and the second battery adapter.

2. The battery assembly of claim 1 wherein the first battery adapter is a height adapter.

3. The battery assembly of claim 1 wherein the second battery adapter is a hold-down adapter.

4. The battery assembly of claim 1 wherein the second battery adapter includes at least one connector configured for coupling with the first battery adapter.

5. The battery assembly of claim 4 wherein the connector is also configured for attachment to a base of a battery.

6. The battery assembly of claim 4 wherein the first battery adapter includes at least one catch for coupling with the connector.

7. The battery assembly of claim 1 wherein the first battery adapter is configured for attachment to an identical battery adapter.

8. A battery assembly comprising:
   a battery;
   a first battery adapter coupled to the battery; and
   a second battery adapter coupled to the first battery adapter;

wherein the first battery adapter includes indicia and the second battery adapter includes an aperture for revealing the indicia when the second battery adapter is attached to the first battery adapter.

9. The battery assembly of claim 1 wherein the first battery adapter is removably coupled to the battery and the second battery adapter is removably coupled to the first battery adapter.

10. The battery assembly of claim 1 wherein the first battery adapter includes at least one aperture configured for receiving a battery terminal therein.

11. A battery adapter comprising:
   a frame; and
   a plurality of connectors extending from the frame and configured for selective coupling with a second battery adapter having a different configuration than the battery adapter;
   wherein the plurality of connectors are also configured for coupling with a feature provided at a base of a battery when the battery adapter is selectively decoupled from the second battery adapter.

12. The battery adapter of claim 11 wherein the second battery adapter is a height adapter.

13. The battery adapter of claim 11 wherein the second battery adapter is a hold-down adapter.

14. The battery adapter of claim 11 wherein the second battery adapter has a configuration substantially identical to the battery adapter.

15. The battery adapter of claim 11 wherein the feature is a hold-down ledge provided at the base of a battery.

16. The battery adapter of claim 11 further comprising at least one rib extending between opposing sides of the frame.

17. A system for adapting the effective size of a single battery of a type having a top and a base for installation and use, comprising:
   a first adapter;
   a second adapter formed separately from the first adapter and having a configuration that differs from that of the first adapter, the first adapter being configured to be coupled to the base of the battery; and
   at least one connector configured to removably couple the first adapter to the second adapter in a nested arrangement;
   so that the first adapter can be coupled to the second adapter in the nested arrangement and coupled to the top of the battery and the first adapter can be separated from the second adapter and coupled to the base of the battery.

18. The system of claim 17 wherein the second adapter can be coupled to the base of the battery.

19. The system of claim 17 wherein the first adapter provides for adjustment of the height of the battery.

20. The system of claim 17 wherein the second adapter provides for adjustment of the length of the battery.

21. The system of claim 17 wherein the second adapter provides for adjustment of the width of the battery.

22. The system of claim 17 wherein the connector comprises a projection on the first adapter.

23. The system of claim 22 wherein the second adapter includes a projection extending from the frame of the second adapter for coupling with the connector on the first adapter.

24. The system of claim 17 wherein the connector comprises a projection on the second adapter.

25. The system of claim 24 wherein the first adapter includes a projection extending from the frame of the first adapter for coupling with the connector from the second adapter.

26. The system of claim 17 wherein the connector is also configured to attach one of the first adapter and the second adapter to a feature provided at the base of the battery.

27. The system of claim 24 wherein the connector is provided in the form of a flexible clip.

28. The system of claim 17 wherein at least one of the first adapter and the second adapter includes a notch for receiving a portion of a battery handle when the system is provided proximate a top surface of the battery.

29. The system of claim 17 wherein at least one of the first adapter and the second adapter includes a rib extending between opposite sides of the frame.

30. The system of claim 29 wherein the rib is configured to provide a surface on which a portion of a battery handle may rest when the adapter system is provided proximate a top surface of the battery.

31. The system of claim 17 wherein the frame of at least one of the first adapter and the second adapter defines an aperture through the adapter.

32. The system of claim 17 wherein at least one of the first adapter and the second adapter include a plurality of guides extending from the frame for preventing lateral movement of the battery when the adapter is coupled to the battery.

33. The system of claim 32 wherein the plurality of guides extend substantially perpendicular to the plane of the generally planar frame of the adapter.

34. The system of claim 17 wherein one of the first adapter and the second adapter includes indicia provided on the frame and the other of the first adapter and the second adapter includes an aperture through which the indicia is visible when the first adapter and the second adapter are coupled together.

35. The system of claim 17 wherein at least one of the first adapter and the second adapter includes drainage holes provided in the frame.

36. The system of claim 17 wherein at least one of the first adapter and the second adapter include an aperture provided therein for receiving a battery terminal when the adapter is provided on a top surface of the battery.

37. A battery and adapter system combination comprising:
   a battery having a top surface and a base;
   a first adapter;
   a second adapter formed separately from the first adapter and having a configuration that differs from that of the first adapter, the first adapter being configured to be coupled to the base of the battery; and
   at least one connector configured to removably couple the first adapter to the second adapter in a nested arrangement;
   so that the first adapter can be coupled to the second adapter in the nested arrangement and coupled to the top of the battery and the first adapter can be separated from the second adapter and coupled to the base of the battery.

38. The battery and adapter system of claim 37 wherein the at least one connector is also configured to attach one of the first adapter and the second adapter to a feature provided at the base of the battery.

39. The battery and adapter system of claim 37 wherein the at least one connector is provided in the form of a flexible clip.

40. The battery and adapter system of claim 37 wherein the at least one connector extends from one of the first adapter and the second adapter and the other of the first adapter and the second adapter includes a projection extending from its frame for coupling with the connector.

41. The battery and adapter system of claim 37 wherein at least one of the first adapter and the second adapter includes a notch for receiving a portion of a battery handle when the adapter system is provided proximate a top surface of the battery.

42. The battery and adapter system of claim 37 wherein at least one of the first adapter and the second adapter includes a rib extending between opposite sides of the frame.

43. The battery and adapter system of claim 37 wherein the frame of at least one of the first adapter and the second adapter defines an aperture through the adapter.

44. The battery and adapter system of claim 37 wherein at least one of the first adapter and the second adapter include a plurality of guides extending from the frame for preventing lateral movement of the battery when the adapter is coupled to the battery.

45. The battery and adapter system of claim 37 wherein one of the first adapter and the second adapter includes indicia provided on the frame and the other of the first adapter and the second adapter includes an aperture through which the indicia is visible when the first adapter and the second adapter are coupled together.

46. The battery and adapter system of claim 37 wherein at least one of the first adapter and the second adapter includes drainage holes formed in the frame.

47. An adapter system for a battery having a container that contains a plurality of battery cells and which includes a cover, a base, and a plurality of sides, the adapter system comprising:
   a first adapter configured for altering the effective size of the battery; and
   a second adapter configured for altering the effective size of the battery and having a different configuration than the first adapter;
   wherein in a first configuration the first adapter is configured for selective coupling with the second adapter, the first adapter including a connector configured to engage a feature provided on the second adapter when the first adapter is coupled to the second adapter;
   wherein in a second configuration the first adapter is configured for coupling to the base of the container, the first adapter including a connector configured to engage a feature provided at the base of the battery;
   wherein in a third configuration the second adapter is configured for coupling to the base of the container, the second adapter including a connector configured to engage the feature provided at the base of the battery.

48. The adapter system of claim 47 wherein at least one of the first adapter and the second adapter includes an aperture for receiving therein a battery terminal protruding from the cover when the adapter is coupled to the cover of the battery.

49. The adapter system of claim 47 wherein the connector configured to engage a feature provided on the second adapter and the connector configured to engage a feature provided at a base of the battery are the same connector.

50. The adapter system of claim 49 wherein the connector configured to engage a feature provided on the second adapter and the connector configured to engage a feature provided at a base of the battery is a relatively flexible clip.

51. The adapter system of claim 47 wherein each of the first adapter and the second adapter are configured for selective coupling and decoupling from each other and from the base of the battery.

52. The adapter system of claim 47 wherein the first adapter and the second adapter in the first configuration are configured for installation on the cover of the battery.

53. A battery and adapter system comprising:
   a battery having a container that contains a plurality of battery cells and which includes a cover and a base;
   a first adapter configured for increasing a first dimension of the battery; and
   a second adapter configured for increasing a second dimension of the battery different than the first dimension of the battery;
   wherein in a first condition the first adapter may be nested with the second adapter and selectively coupled the container, the first adapter being selectively coupled to the second adapter;
   wherein in a second condition the first adapter and the second adapter may be removed from the battery while the first adapter is nested with the second adapter;
   wherein in a third condition the first adapter may be removed from the second adapter and selectively coupled to the base of the container; and
   wherein in a fourth condition the second adapter may be removed from the first adapter and selectively coupled to the base of the container.

54. The battery and adapter system of claim 53 wherein at least one of the first adapter and the second adapter include an aperture for revealing indicia on the other of the first adapter and the second adapter when the first adapter and the second adapter are nested in the first condition.

55. The battery and adapter system of claim 54 wherein the indicia is selected from a warning label and a product label.

56. The battery and adapter system of claim 53 wherein in a fifth condition the first adapter may be selectively re-coupled to the second adapter and the first adapter and the second adapter may be selectively coupled to the cover of the container.

57. The battery and adapter system of claim 53 wherein in the first condition at least a portion of the first adapter is received within a portion of the second adapter.

58. The battery and adapter system of claim 53 wherein in the first condition the first adapter and the second adapter are coupled to the cover of the battery.

59. The battery and adapter system of claim 53 wherein in the third condition the first adapter is coupled to the base of the container to increase the effective width of the container.

60. The battery and adapter system of claim 53 wherein in the fourth condition the second adapter is coupled to the base of the container to increase the effective height of the container.

61. The battery and adapter system of claim 53 wherein the first adapter and the second adapter each include a clip for coupling the first adapter and the second adapter to the base of the battery.

* * * * *